(12) United States Patent
Sullivan et al.

(10) Patent No.: US 10,893,031 B2
(45) Date of Patent: *Jan. 12, 2021

(54) DYNAMICALLY SERVING DIGITAL CERTIFICATES BASED ON SECURE SESSION PROPERTIES

(71) Applicant: CLOUDFLARE, INC., San Francisco, CA (US)

(72) Inventors: Nicholas Thomas Sullivan, San Francisco, CA (US); Lee Hahn Holloway, Santa Cruz, CA (US); Piotr Sikora, San Francisco, CA (US); Ryan Lackey, Seattle, WA (US); John Graham-Cumming, London (GB); Dane Orion Knecht, San Francisco, CA (US); Patrick Donahue, San Francisco, CA (US); Zi Lin, San Francisco, CA (US)

(73) Assignee: CLOUDFLARE, INC., San Francisco, CA (US)

(*) Notice: Subject to any disclaimer, the term of this patent is extended or adjusted under 35 U.S.C. 154(b) by 53 days.

This patent is subject to a terminal disclaimer.

(21) Appl. No.: 16/422,947

(22) Filed: May 24, 2019

(65) Prior Publication Data
US 2019/0281032 A1    Sep. 12, 2019

Related U.S. Application Data

(63) Continuation of application No. 14/964,491, filed on Dec. 9, 2015, now Pat. No. 10,305,871.

(51) Int. Cl.
*H04L 29/06* (2006.01)
*H04L 9/32* (2006.01)
*G06F 21/33* (2013.01)

(52) U.S. Cl.
CPC ............ *H04L 63/061* (2013.01); *G06F 21/33* (2013.01); *H04L 9/3247* (2013.01); *H04L 9/3263* (2013.01); *H04L 63/205* (2013.01)

(58) Field of Classification Search
CPC ... H04L 63/061; H04L 9/3247; H04L 9/3263; H04L 63/205; G06F 21/33
See application file for complete search history.

(56) References Cited

U.S. PATENT DOCUMENTS

| 6,134,658 A | 10/2000 | Multerer et al. |
| 6,816,871 B2 | 11/2004 | Lee |

(Continued)

FOREIGN PATENT DOCUMENTS

| CN | 102546572 A | 7/2012 |
| WO | 2016153423 A1 | 9/2016 |

OTHER PUBLICATIONS

"Baseline Requirements Certificate Policy for the Issuance and Management of Publicly-Trusted Certificates," CA/Browser Forum, cabforum.org, Version 1.3.0, Apr. 16, 2015, 53 pages.

(Continued)

*Primary Examiner* — Darren B Schwartz
(74) *Attorney, Agent, or Firm* — Nicholson de Vos Webster & Elliott LLP

(57) ABSTRACT

A server receives a request from a client to establish a secure session. The server analyzes the request to determine a set of one or more properties of the request. The server selects, based at least in part on the determined set of properties, one of multiple certificates for a hostname of the server, where each of the certificates is signed using a different signature and hash algorithm pair. The server returns the selected certificate to the client.

21 Claims, 13 Drawing Sheets

(56) References Cited

U.S. PATENT DOCUMENTS

| | | | |
|---|---|---|---|
| 6,981,139 | B2 | 12/2005 | Enokida |
| 7,484,089 | B1 | 1/2009 | Kogen et al. |
| 8,132,247 | B2 | 3/2012 | Adhya et al. |
| 8,181,035 | B1* | 5/2012 | Fernandez Gutierrez ............... H04L 9/3247 713/187 |
| 8,214,635 | B2 | 7/2012 | Wang et al. |
| 8,533,453 | B2 | 9/2013 | Miller et al. |
| 8,621,078 | B1 | 12/2013 | Mukerji et al. |
| 8,738,902 | B2 | 5/2014 | Yoo et al. |
| 8,782,774 | B1 | 7/2014 | Pahl et al. |
| 8,914,641 | B2 | 12/2014 | Gopal et al. |
| 8,966,267 | B1 | 2/2015 | Pahl et al. |
| 8,996,873 | B1 | 3/2015 | Pahl et al. |
| 9,184,911 | B2 | 11/2015 | Pahl et al. |
| 9,391,979 | B1 | 7/2016 | Newton |
| 9,479,480 | B2 | 10/2016 | Ovsiannikov et al. |
| 9,705,852 | B2 | 7/2017 | Bollay et al. |
| 9,785,491 | B2 | 10/2017 | Cilfone et al. |
| 2002/0108041 | A1 | 8/2002 | Watanabe et al. |
| 2002/0108042 | A1* | 8/2002 | Oka ............... H04L 9/3263 713/175 |
| 2004/0117314 | A1* | 6/2004 | Bleumer ............... H04L 9/3252 705/60 |
| 2004/0148505 | A1 | 7/2004 | Qiu |
| 2004/0243805 | A1 | 12/2004 | Enokida |
| 2005/0074124 | A1 | 4/2005 | Thornton et al. |
| 2005/0081029 | A1 | 4/2005 | Thornton et al. |
| 2006/0106836 | A1 | 5/2006 | Masugi et al. |
| 2006/0212707 | A1 | 9/2006 | Cahill et al. |
| 2008/0307219 | A1 | 12/2008 | Karandikar |
| 2009/0083537 | A1 | 3/2009 | Larsen et al. |
| 2009/0300349 | A1 | 12/2009 | Hashimoto et al. |
| 2010/0111300 | A1 | 5/2010 | Kido et al. |
| 2012/0030469 | A1 | 2/2012 | Hsueh et al. |
| 2014/0149740 | A1 | 5/2014 | Sato et al. |
| 2014/0161255 | A1 | 6/2014 | Tonegawa |
| 2015/0095648 | A1* | 4/2015 | Nix ............... H04W 52/0216 713/170 |
| 2015/0106616 | A1 | 4/2015 | Nix |
| 2015/0180860 | A1 | 6/2015 | Klieman et al. |
| 2015/0288514 | A1 | 10/2015 | Pahl et al. |
| 2016/0021110 | A1 | 1/2016 | Sugano |
| 2017/0012967 | A1 | 1/2017 | Holloway et al. |

OTHER PUBLICATIONS

Moeller B., et al., "TLS Fallback Signaling Cipher Suite Value (SCSV) for Preventing Protocol Downgrade Attacks", internet Engineering Task Force (IETF), Request for Comments: 7507, Apr. 2015, 8 pages.
Notice of Allowance from U.S. Appl. No. 14/964,491, dated Jan. 25, 2019, 10 pages.
Notice of Allowance from U.S. Appl. No. 14/964,491, dated Dec. 26, 2017, 10 pages.
Notice of Allowance for U.S. Appl. No. 14/964,491, dated Apr. 26, 2016, 18 pages.
Notice of Allowance from U.S. Appl. No. 14/964,491, dated Apr. 27, 2017, 10 pages.
Notice of Allowance from U.S. Appl. No. 14/964,491, dated Aug. 15, 2017, 10 pages.
Notice of Allowance from U.S. Appl. No. 14/964,491 dated Aug. 26, 2016, 8 pages.
Notice of Allowance from U.S. Appl. No. 14/964,491 dated Jan. 3, 2017, 10 pages.
Notice of Allowance from U.S. Appl. No. 14/964,491 dated May 16, 2018, 10 pages.
Notice of Allowance from U.S. Appl. No. 14/964,491, dated Sep. 12, 2018, 9 pages.
Parramore I, "How to Support Non-SNI Capable Clients with Web Application Proxy and AD FS 2012 R2," Jun. 19, 2014, retrieved from https://blogs.technet.microsoft.com/applicationproxyblog/2014/06/19/how-to-support-non-sni-capable-clients-with-web-application-proxy-and-ad-fs-2012-r2/ on Nov. 15, 2017, 18 pages.
RFC 4346: Dierks T., "Network Working Group, The Transport Layer Security (TLS) Protocol Version 1.1," Request for Comments: 4346, 2006, 87 pages.
RFC 5246: Dierks T., "Network Working Group, The Transport Layer Security (TLS) Protocol Version 1.2," Request for Comments: 5246, 2008, 104 pages.
RFC 6101: Freier A., et al., "The Secure Sockets Layer (SSL) Protocol Version 3.0," Internet Engineering Task Force (IETF), Request for Comments: 6101, 2011, 67 pages.
S. Blake-Wilson et al., Transport Layer Security (TLS) Extensions Network Working Group, Request for Comments: 3546, Jun. 2003, 29 pages.
T. Dierks et al., The TLS Protocol Version 1.0, Network Working Group, Request for Comments: 2246, Jan. 1999, 80 pages.

* cited by examiner

DYNAMICALLY SERVING DIGITAL CERTIFICATES BASED ON SECURE SESSION PROPERTIES

CROSS-REFERENCE TO RELATED APPLICATIONS

This application is a continuation of application Ser. No. 14/964,491, filed Dec. 9, 2015, which is hereby incorporated by reference.

FIELD

Embodiments of the invention relate to the field of secure network communications; and more specifically, to dynamically serving digital certificates based on secure session properties (e.g., Transport Layer Security (TLS) properties).

BACKGROUND

Secure Sockets Layer (SSL) and Transport Layer Security (TLS), which is the successor to SSL, provide secure network connections. SSL and/or TLS are commonly used during web browsing (e.g., using HTTPS), email, and other Internet applications. SSL and TLS are described in several Request For Comments (RFCs), including RFC 2246 (describing TLS 1.0), RFC 4346 (describing TLS 1.1), RFC 5246 (describing TLS 1.2), and RFC 6101 (describing SSL 3.0).

An SSL or TLS client and server negotiate a set of parameters to establish a secure session in a process called a handshake. For example, the client first transmits a hello message (referred to as a ClientHello message) that includes the following: an indication of the requested version of the SSL or TLS protocol, a requested session identifier used to identify the session connection, a list of the cipher suites supported by the client, a list of the compression methods supported by the client, random data used for cryptographic purposes (sometimes referred to as ClientHello.random), and may indicate whether and what type of extensions (defined by the protocol) the client supports. The extensions portion is covered by a set of RFCs and the Internet Assigned Numbers Authority (IANA) maintains the list of protocol parameters.

In response to the ClientHello message, the server transmits a hello message to the client (referred to as a ServerHello message) that includes the version of the SSL or TLS protocol supported by the server, a session identifier that will be used to identify the session, the selected cipher suite (selected from the list of cipher suites included in the ClientHello message), the selected compression method (selected from the list of compression methods included in the ClientHello message), random data used for cryptographic purposes that is different than the random data included in the ClientHello message (sometimes referred to as ServerHello.random), and may include a list of the extensions that the server supports.

Following the hello message, the server transmits a list of its certificate(s) in a message referred to as a Certificate message (sometimes referred to as a Server Certificate message). The server then transmits a message indicating that the hello-message phase of the handshake is complete (referred to as a ServerHelloDone message). Typically for TLS sites, the certificate is chosen based on the IP address that is being connected to or based on the destination hostname included in a Server Name Indication (SNI) extension.

Different certificates are signed using different signature and hash algorithm pairs. Older clients may not support newer signature/hash algorithm pairs. On the other hand, older signature/hash algorithm pairs may not be secure. A client will experience degraded experience if it does not support the certificate used by the site. For instance, the client may display a warning or an ominous interstitial screen to the user; or may block the connection entirely.

SUMMARY

A server receives a request from a client to establish a secure session. The server analyzes the request to determine a set of one or more properties of the request. The server selects, based at least in part on the determined set of properties, one of multiple certificates for a hostname of the server, where each of the certificates is signed using a different signature and hash algorithm pair. The server returns the selected certificate to the client.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
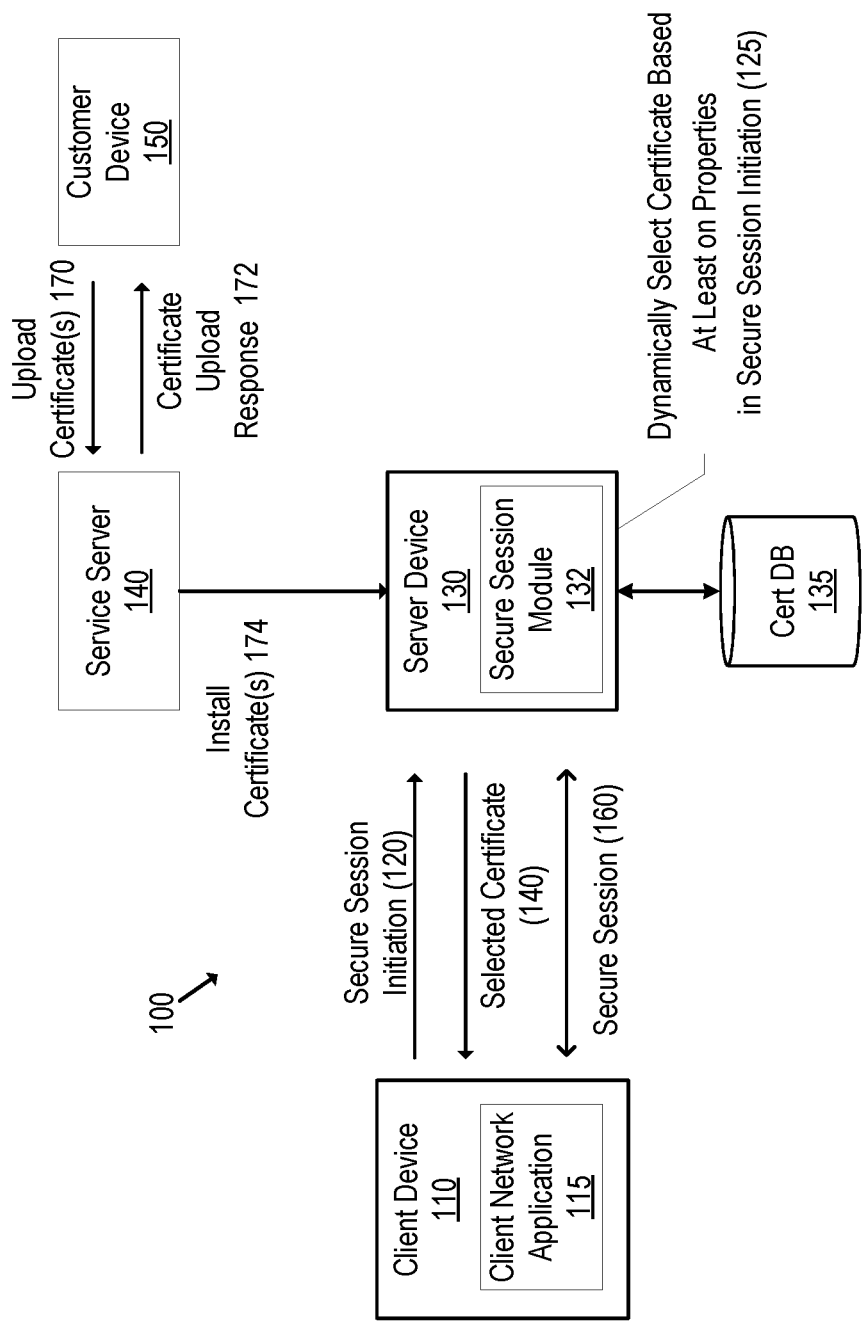
FIG. 1 illustrates an exemplary system for dynamically serving a certificate based on secure session properties of a request for a secure session according to an embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for dynamically serving a digital certificate ("certificate") based on secure session properties of a message initiating a secure session is described. In an embodiment, a server has access to multiple certificates for a hostname that are signed with different signature and hash algorithm pairs, and dynamically selects which certificate to return to a requesting client based on one or more secure session properties included in a request for a secure session (e.g., a TLS ClientHello message) received from the requesting client. The secure session properties may include extensions of the request (e.g., the Server Name Indication (SNI) extension, and/or the signature algorithm extension) and/or the list of cipher suites supported by the client and indicated in the request.

As a specific example, if a secure session request is received that does not include the SNI extension (which typically indicates that the browser and/or operating system is relatively old), the server selects from the multiple certificates a certificate that is compatible for the requesting client (e.g., a certificate signed using an RSA signature algorithm with a SHA-1 cryptographic hash algorithm) and returns the certificate to the requesting device.

As another example, if a secure session request is received that includes the SNI extension but does not include the signature algorithm extension (and thus the server cannot infer which signature and hash algorithm pairs are supported by the client), then the server may select, from the multiple certificates, a certificate that is compatible for the requesting client (e.g., a certificate signed using an RSA signature algorithm with a SHA-1 cryptographic hash algorithm).

As another example, if a secure session request is received that includes the SNI extension but does not include the signature algorithm extension, then the server may select, from the multiple certificates, a certificate that is signed using a preferred signature algorithm that is indicated as being supported in the list of cipher suites supported by the requesting client. For instance, if the preferred signature algorithm is ECDSA (e.g., over RSA) and the list of cipher suites indicates that the client supports ECDSA, the server may select a certificate signed using the ECDSA signature algorithm with a SHA-1 cryptographic hash algorithm.

As another example, if a secure session request is received that includes the SNI extension and includes the signature algorithm extension, the server may select, from the multiple certificates, a certificate that is compatible for the requesting client based on the signature algorithms supported by the requesting client and the cipher suites supported by the requesting client. For instance, if the signature algorithm extension indicates that the client supports the ECDSA signature algorithm with a SHA-256 cryptographic hash algorithm and the server shares a compatible ECDSA cipher suite with the client (as indicated in the list of cipher suites supported by the client) and has access to a compatible certificate for the hostname, the server will respond to the client with that certificate. If the signature algorithm extension indicates that client supports the RSA signature algorithm with a SHA-256 cryptographic hash algorithm and the server shares a compatible RSA cipher suite with the client (as indicated in the list of cipher suites supported by the client) and has access to a compatible certificate for the hostname, the server will respond to the client with that certificate. If the signature algorithm extension indicates that the client supports the ECDSA signature algorithm with a SHA-256 cryptographic hash algorithm; and also supports the RSA signature algorithm with a SHA-256 cryptographic hash algorithm; and the server shares a compatible RSA cipher suite and a compatible ECDSA cipher suite with the client; and the server has access to compatible RSA and ECDSA certificates for the hostname, the server may respond with a compatible certificate signed using ECDSA with the SHA-256 cryptographic hash algorithm.

FIG. 1 illustrates an exemplary system for dynamically serving a certificate based on secure session properties of a request for a secure session according to an embodiment. The system 100 includes the client device 110, which is a computing device (e.g., desktop, laptop, smartphone, mobile phone, tablet, gaming system, set-top box, server, etc.) that includes the client network application 115 (e.g., a web browser or other application) that is capable of accessing network resources and is capable of acting as a client in a secure session. It should be understood that the use of the term "client device" herein does not require that the device be an end-user client device. Rather, the term "client device" is used herein to refer to a computing device that operates as a client in the client-server relationship of a secure session (e.g., SSL and/or TLS).

The server device 130 is a computing device that includes the secure session module 132 that participates in establishing secure sessions with client devices. For example, the client network application 115 initiates a secure session by transmitting a request to the server device 130. The request may be a SSL or TLS ClientHello message (sometimes referred herein as a ClientHello message). The properties of the secure session request (the ClientHello message) can be different depending on the capabilities of the client network application 115 and/or the operating system on the client device 110. For example, some ClientHello messages may include the SNI extension while others may not, depending on the capabilities of the client network application 115 and/or the operating system running on the client device 110.

The server device 130 is coupled with the certificate database 135 that stores certificates for hostnames. The certificate database 135 may be incorporated within the server device 130 or be located remotely from the server device 130. The certificate database 135 may store multiple certificates for a hostname each being signed using a different signature/hash algorithm pair. For instance, the certificate database 135 may store for a hostname: a certificate signed with the RSA signature algorithm with a SHA-1 cryptographic hash algorithm; a certificate signed with the RSA signature algorithm with a SHA-256 cryptographic hash algorithm; a certificate signed with the ECDSA signature algorithm with a SHA-1 cryptographic hash algorithm; and/or a certificate signed with the ECDSA signature algorithm with a SHA-256 cryptographic hash algorithm. The certificates for a particular hostname may be uploaded by a customer that owns or manages that hostname and/or generated for the customer for the hostname.

The secure session module 132 of the server device 130 receives the secure session initiation request 120 from the client network application 115 (e.g., a Client Hello message) that initiates the establishment of a secure session between the client network application 115 and the server device 130. If there are multiple certificates installed for the hostname, the secure session module 132 dynamically selects 125 one of those certificates to use for the secure session based at least in part on one or more secure session properties included in the secure session initiation request. The secure session properties may include extensions of the request (e.g., the Server Name Indication (SNI) extension, and/or the signature algorithm extension) and/or the list of cipher suites supported by the client and indicated in the request, for example. The server device 130 responds with the selected certificate 140 to the requesting client network application 115 and the secure session negotiation continues using the selected certificate. After the client network application 115 and the secure session module 132 establish a secure session, traffic between them can be sent encrypted on the secure session 160. It should be understood that there may be, and often are, additional messages sent between the client network application 115 and the secure session module 132 to establish the secure session 160 that are not illustrated in FIG. 1 so as to not obscure understanding of the embodiment.

In an embodiment, a customer device 150, which is a computing device of a customer of the service, uploads one or more certificates 170 bound to a particular hostname to the service server 140. An embodiment of uploading a certificate will be described in greater detail later herein. The service server 140 may analyze the uploaded certificate(s). Based on the analysis, the service server 140 may present a certificate upload response 172 to the customer. The certificate upload response 172 may indicate any known weaknesses of those certificates, such as if the cipher is not recommended or known to be insecure. The certificate upload response 172 may specify which clients (e.g., which browsers) support the uploaded certificate(s). The service server 140 may allow the customer to specify the priority in which the certificates will be used for the hostname and/or which certificate to use as a fallback in cases where a client does not support the preferred certificate(s).

The service server 140 may install the uploaded certificate(s) 174 to the server device 130 and/or to the certificate database 135. In an embodiment, the server device 130 is one of multiple servers that are geographically distributed in multiple point of presences (POPs). A POP is a collection of networking equipment (e.g., server(s) and may include authoritative name server(s)) that are geographically distributed to decrease the distance between requesting client devices and the content. Multiple servers may have the same anycast IP address. The network topology determines the best route to find the nearest server. For example, when a DNS request is made, the network transmits the DNS request to the closest authoritative name server. That authoritative name server then responds with a server within that POP. Accordingly, a visitor will be bound to that server until the next DNS resolution for the requested domain (according to the TTL (time to live) value as provided by the authoritative name server). Thus, an anycast IP address allows a domain to resolve to a physically different server depending on location of the client device even though the servers share the same IP address. As a result of having multiple servers, the certificates may be installed in multiple locations.

Figure 2:
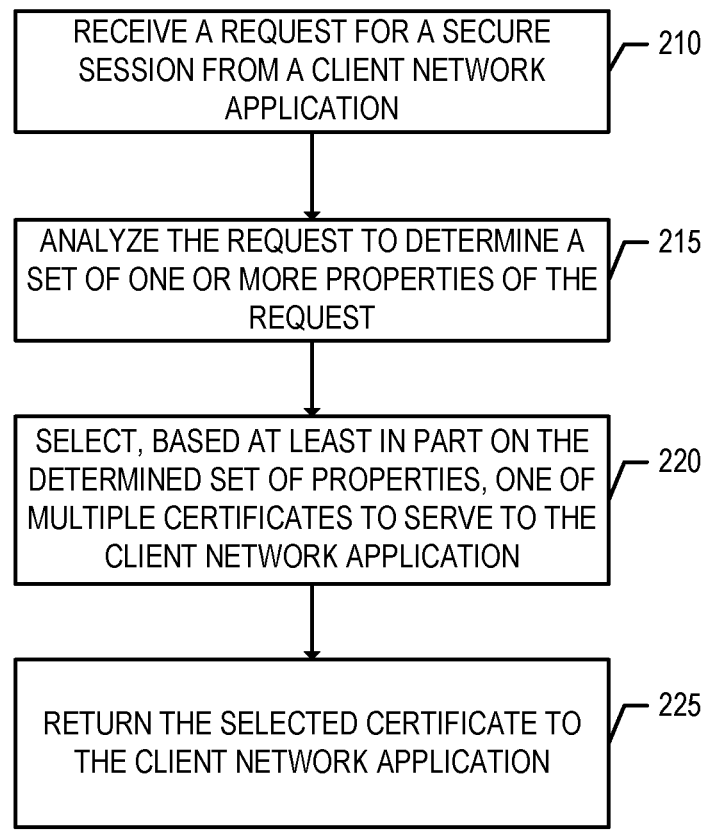
FIG. 2 is a flow diagram that illustrates exemplary operations for dynamically selecting a certificate based on secure session properties of a request for a secure session according to an embodiment.

FIG. 2 is a flow diagram that illustrates exemplary operations for dynamically selecting a certificate based on secure session properties of a request for a secure session according to an embodiment. The operations of FIG. 2 and other flow diagrams will be described with reference to the exemplary embodiment of FIG. 1. However, the operations of FIG. 2 and the other flow diagrams can be performed by embodiments other than those discussed with reference to FIG. 1; and the embodiment described with reference to FIG. 1 can perform operations different than those of FIG. 2 and the other flow diagrams.

At operation 210, the secure session module 132 receives a request for a secure session from the client network application 115 where the request initiates a handshake procedure to establish a secure session. The request may be a ClientHello message (e.g., an SSL or TLS ClientHello message). The request includes one or more secure session properties, which may be different depending on the protocol and capabilities of the client network application 115.

Next, at operation 215, the secure session module 132 analyzes the request to determine a set of one or more properties of the request. The determined one or more properties allow the secure session module 132 to infer the capabilities of the client network application 115 and what certificate would be supported by the client network application 115.

For example, a property of the request may be whether the request specifies the destination hostname of the server (e.g., through a Server Name Indication (SNI) extension). The SNI extension is described in RFC 3546, June 2003. A request that does not specify the destination hostname may be an indication that the requesting client network application is relatively old and limited as to what it supports for cryptographic parameters. For instance, lack of the destination hostname may indicate that the client network application cannot support certificates that use the SHA-2 (Secure Hash Algorithm 2) family of cryptographic hash functions.

As another example, a property of the request may be whether the request specifies which signature/hash algorithm pair(s) are supported by the client network application 115 and may be used in digital signatures (e.g., a signature_algorithms extension that defines which signature/hash algorithm pairs are supported by the client network application 115 and may be used in digital signatures). The signature_algorithms extension is described in RFC 5246, August 2008. The signature/hash algorithm pair(s) specified in the request can be used to determine which certificate(s) available to the secure session module 132, if any, are supported by the client network application 115. For instance, if the request only identifies a signature/hash algorithm pair that uses an RSA signature algorithm, a certificate that is signed using a different signature algorithm (e.g., an ECDSA signature algorithm) will likely not be supported by the client network application 115.

As another example, a property of the request may be the list of cipher suites supported by the client network application 115. The secure session module 132 may use this property to select a certificate compatible for the secure session. For instance, if the list of cipher suites does not include an ECDSA cipher suite, a certificate that uses the ECDSA may not be supported by the client network application 115. The list of cipher suites may also be compared against the list of cipher suites supported by the secure session module 132 so that a shared cipher suite may be used.

Next, at operation 220, the secure session module 132 selects, based at least in part on the determined set of properties of the request, one of the multiple certificates to serve to the requesting client network application 115. The selection may depend on certificate selection rules, which may be defined by the customer. For instance, the certificate selection rules may provide a preference of which certificate to select based on the set of properties. For instance, if the set of properties indicates that the client network application 115 can support the ECDSA and RSA signature algorithm and there are ECDSA and RSA certificates available for the hostname, the client selection rules may provide a preference as to use an ECDSA certificate over an RSA certificate or vice versa. As another example, the certificate selection rules may provide a preference for the strength of the cryptographic hash algorithm used. For example, the certificate selection rules may provide a preference for cryptographic hash algorithms that use particular hash values (e.g., 256 bits, 512 bits etc.). The certificate selection rules may provide a default or fallback certificate to use that is supported by most client network applications, even though it may not be the most secure (e.g., a certificate signed using RSA with a SHA-1 cryptographic hash algorithm). In an embodiment, if there is not a certificate that is not compatible with the requesting client network application 115, the secure session module 132 returns an error to the requesting client network application 115.

Next, at operation 225, the secure session module 132 returns the selected certificate to the requesting client network application 115. The selected certificate may be returned in a Certificate message. The client network application 115 and the secure session module 132 continue the establishment of the secure session.

Figure 3:
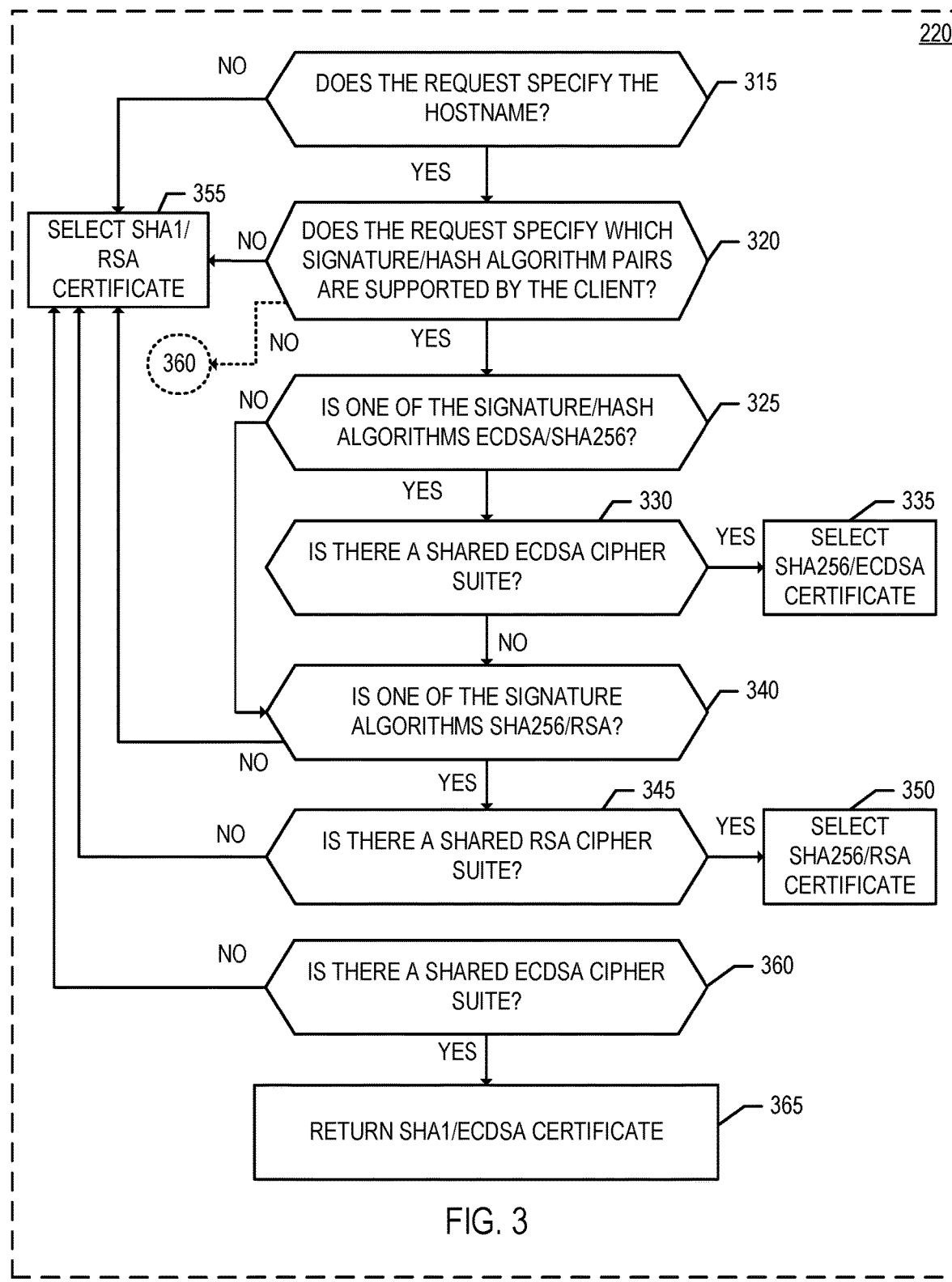
FIG. 3 is a flow diagram that illustrates exemplary operations for dynamically selecting one of multiple certificates to serve to a requesting client network application based on at least in part on one or more properties of the request for a secure session according to an embodiment.

FIG. 3 is a flow diagram that illustrates exemplary operations for dynamically selecting one of multiple certificates to serve to a requesting client network application based on at least in part on one or more properties of the request for a secure session according to an embodiment. The operations of FIG. 3 may be performed during the operation 220 described in FIG. 2. At operation 315, the secure session module 132 determines whether the request specifies the destination hostname. For example, the request may be a ClientHello message that may include the SNI extension that specifies the destination hostname. Most modern network client applications support SNI and include the extension in the ClientHello message. A request that does not include the destination hostname may be an indication that the requesting client network application is relatively old and limited as to what it supports for cryptographic parameters. For instance, not including SNI in the ClientHello message may indicate that the client network application 115 cannot support certificates that use the SHA-2 (Secure Hash Algorithm 2) family of cryptographic hash functions. If the secure session module 132 determines that the request does not specify the destination hostname, then a fallback certificate may be returned to the requesting client, where the fallback certificate is one that the client network application 115 likely supports, even though it may not be the most secure. In the example of FIG. 3, the fallback certificate is signed using an RSA signature algorithm with a SHA-1 cryptographic hash algorithm. If the request does not specify the hostname, then control moves to operation 355 and the secure session module 132 selects a certificate signed using an RSA signature algorithm with a SHA-1 cryptographic hash algorithm. If the request does specify the hostname, then flow moves to operation 320.

At operation 320, the secure session module 132 determines whether the request specifies which signature and hash ("signature/hash") algorithm pairs are supported by the client network application 115 and may be used in digital signatures. For instance, the request may be a ClientHello message that may include a signature_algorithms extension that defines which signature/hash algorithm pairs are supported by the client network application 115 and may be used in digital signatures. If the request does not specify which signature/hash algorithm pair(s) are supported, then flow moves to operation 355 and the secure session module 132 selects a certificate signed using an RSA signature algorithm with a SHA-1 cryptographic hash algorithm.

In another embodiment, if the request does not specify which signature/hash algorithm pair(s) are supported and the secure session module 132 has access to multiple certificates that are signed with different signature algorithms, instead of moving to operation 355, the secure session module 132 moves to operation 360 where the secure session module 132 determines whether there is a shared ECDSA cipher suite between the client network application 115 and the secure session module 132. For instance, the secure session module 132 accesses the list of cipher suites supported by the client network application 115 as indicated in the request and determines whether there is an ECDSA cipher suite in the list that is supported by the secure session module 132. If there is not a shared ECDSA cipher suite, then flow moves to operation 355. If there is a shared ECDSA cipher suite, then flow moves to operation 365 where the secure session module 132 selects a certificate for the hostname that is signed using the ECDSA signature algorithm with a SHA-1 cryptographic hash algorithm.

If the request specifies which signature/hash algorithm pair(s) are supported, then flow moves to operation 325 where the secure session module 132 determines whether one of the signature/hash algorithm pair(s) specified in the request uses an ECDSA signature algorithm with a SHA-256 cryptographic hash algorithm. If one of the signature/hash algorithm pair(s) specified in the request uses an ECDSA signature algorithm with a SHA-256 cryptographic hash algorithm, then flow moves to operation 330; otherwise flow moves to operation 340.

At operation 330, the secure session module 132 determines whether there is a shared ECDSA cipher suite between the client network application 115 and the secure session module 132. For instance, the secure session module 132 accesses the list of cipher suites supported by the client network application 115 as indicated in the request and determines whether there is an ECDSA cipher suite in the list that is supported by the secure session module 132. If there is not a shared ECDSA cipher suite, then flow moves to operation 340. If there is a shared ECDSA cipher suite, then flow moves to operation 335 where the secure session module 132 selects a certificate for the hostname that is signed using the ECDSA signature algorithm with a SHA-256 cryptographic hash algorithm.

At operation 340, the secure session module 132 determines whether one of the signature/hash algorithm pair(s) specified in the request uses an RSA signature algorithm with a SHA-256 cryptographic hash algorithm. If one of the signature/hash algorithm pair(s) specified in the request uses an RSA signature algorithm with a SHA-256 cryptographic hash algorithm, then flow moves to operation 345; otherwise flow moves to operation 255 and the secure session module 132 selects a certificate signed using an RSA signature algorithm with a SHA-1 cryptographic hash algorithm. At operation 345, the secure session module 132 determines whether there is a shared RSA cipher suite between the client network application 115 and the secure session module 132. For instance, the secure session module 132 accesses the list of cipher suites supported by the client network application 115 as indicated in the request and determines whether there is a RSA cipher suite in the list that is supported by the secure session module 132. If there is not a shared RSA cipher suite, then flow moves to operation 355. If there is a shared RSA cipher suite, then flow moves to operation 350 where the secure session module 132 selects a certificate for the hostname that is signed using the RSA signature algorithm with a SHA-256 cryptographic hash algorithm.

Figure 4:
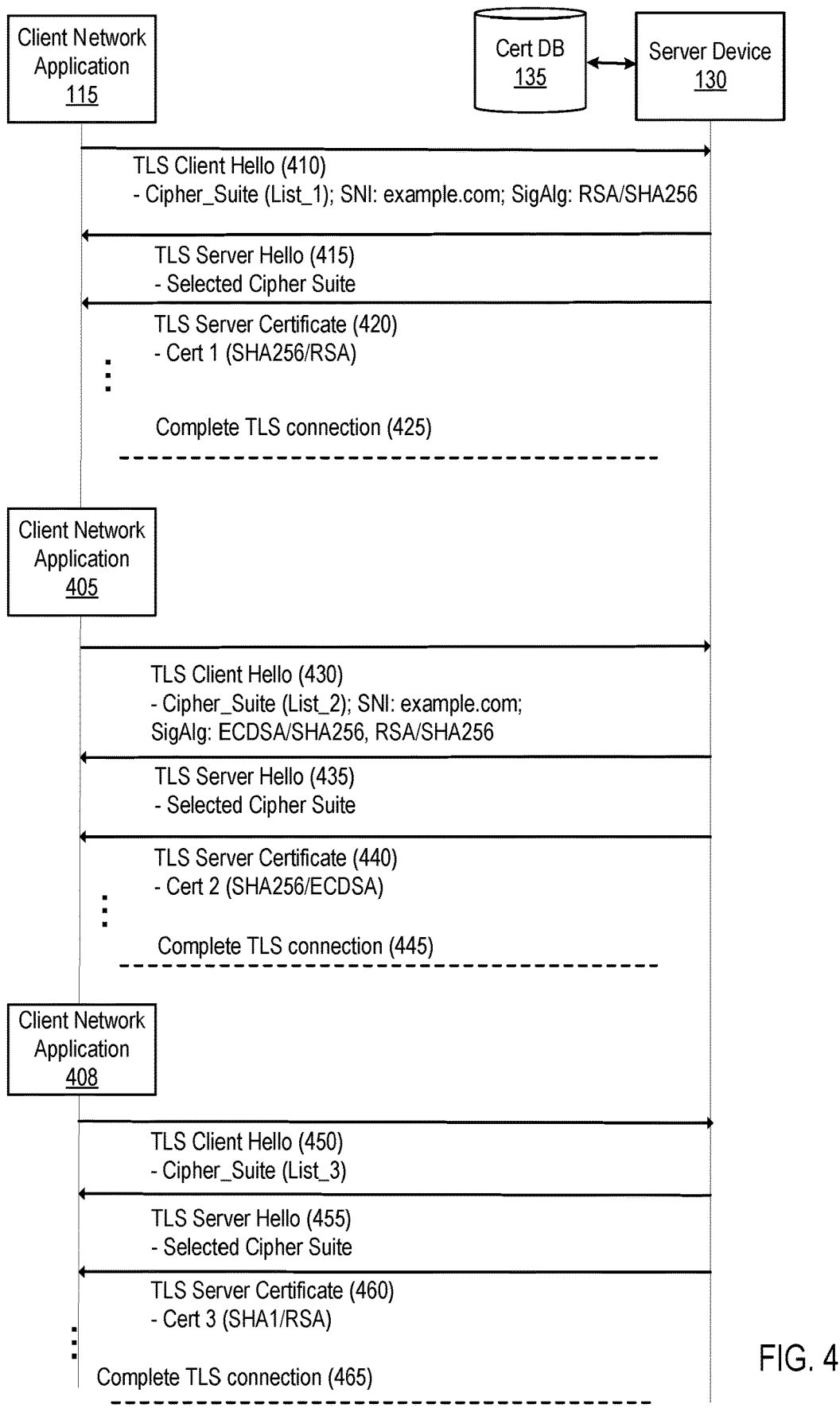
FIG. 4 illustrates an example of the server selecting different certificates for different client network applications based on secure session properties of incoming requests for secure sessions according to an embodiment.

FIG. 4 illustrates an example of the server selecting different certificates for different client network applications based on secure session properties of incoming requests for secure sessions according to an embodiment. The certificate database 135 includes multiple certificates for the hostname that are signed using different signature/hash algorithm pairs. In the example of FIG. 4, the certificate database 135 includes for the hostname example.com, a certificate signed using an RSA signature algorithm with a SHA-1 cryptographic hash algorithm, a certificate signed using an RSA signature algorithm with a SHA-256 cryptographic hash algorithm, and a certificate signed using an ECDSA signature algorithm with a SHA-256 cryptographic hash algorithm. It should be understood that these are example signature/hash algorithm pairs and different signature/hash algorithm pairs may be used when signing certificates.

At operation 410, the secure session module 132 of the server device 130 receives a TLS ClientHello message that includes (among other data) a cipher suite list, an SNI extension that indicates that the destination hostname is example.com, and includes a signature_algorithms extension that specifies that the client network application 115 supports an RSA signature algorithm with a SHA-256 cryptographic hash algorithm. In this example, the signature_algorithms extension does not specify that the client network application 115 supports an ECDSA signature algorithm. The secure session module 132 analyzes the TLS ClientHello message and determines which of the certificates to return to the client network application 115 based on the TLS properties included in the TLS ClientHello message including the cipher suite list, the SNI extension, and the signature_algorithms extension. Based on these properties, the secure session module 132 determines to select the certificate signed with the RSA signature algorithm with a SHA-256 cryptographic hash algorithm. The secure session module 132 responds to the TLS ClientHello message with a TLS ServerHello message that includes the selected cipher suite at operation 415 and transmits a TLS Server Certificate message at operation 420 to the client network application 115 with a certificate signed with the RSA signature algorithm with a SHA-256 cryptographic hash algorithm. The client network application 115 and the secure session module 132 complete the TLS connection at operation 425.

At operation 430, the secure session module 132 of the server device 130 receives a TLS ClientHello message from the client network application 405 that includes (among other data) a cipher suite list, an SNI extension that indicates that the destination hostname is example.com, and includes a signature_algorithms extension that specifies that the client network application 405 supports an ECDSA signature algorithm with a SHA-256 cryptographic hash algorithm, and an RSA signature algorithm with a SHA-256 cryptographic hash algorithm. The secure session module 132 analyzes the TLS ClientHello message and determines which of the certificates to return to the client network application 405 based on the TLS properties included in the TLS ClientHello message including the cipher suite list, the SNI extension, and the signature_algorithms extension. Based on these properties, the secure session module 132 determines to select the certificate signed with the ECDSA signature algorithm with a SHA-256 cryptographic hash algorithm. The secure session module 132 responds to the TLS ClientHello message with a TLS ServerHello message that includes the selected cipher suite at operation 435 and transmits a TLS Server Certificate message at operation 440 to the client network application 405 with a certificate signed with the ECDSA signature algorithm with a SHA-256 cryptographic hash algorithm. The client network application 405 and the secure session module 132 complete the TLS connection at operation 445.

At operation 450, the secure session module 132 of the server device 130 receives a TLS ClientHello message from the client network application 408 that includes (among other data) a cipher suite list. This ClientHello message does not include either an SNI extension or a signature_algorithms extension. The secure session module 132 analyzes the TLS ClientHello message and determines which of the certificates to return to the client network application 408 based on the TLS properties included in the TLS ClientHello message including the cipher suite list, the lack of the SNI extension, and the lack of the signature_algorithms extension. Based on these properties, the secure session module 132 determines to select the certificate signed with the RSA signature algorithm with a SHA-1 cryptographic hash algorithm. The secure session module 132 responds to the TLS ClientHello message with a TLS ServerHello message that includes the selected cipher suite at operation 455 and transmits a TLS Server Certificate message at operation 460 to the client network application 408 with a certificate signed with the RSA signature algorithm with a SHA-1 cryptographic hash algorithm. The client network application 408 and the secure session module 132 complete the TLS connection at operation 465.

Figure 5:
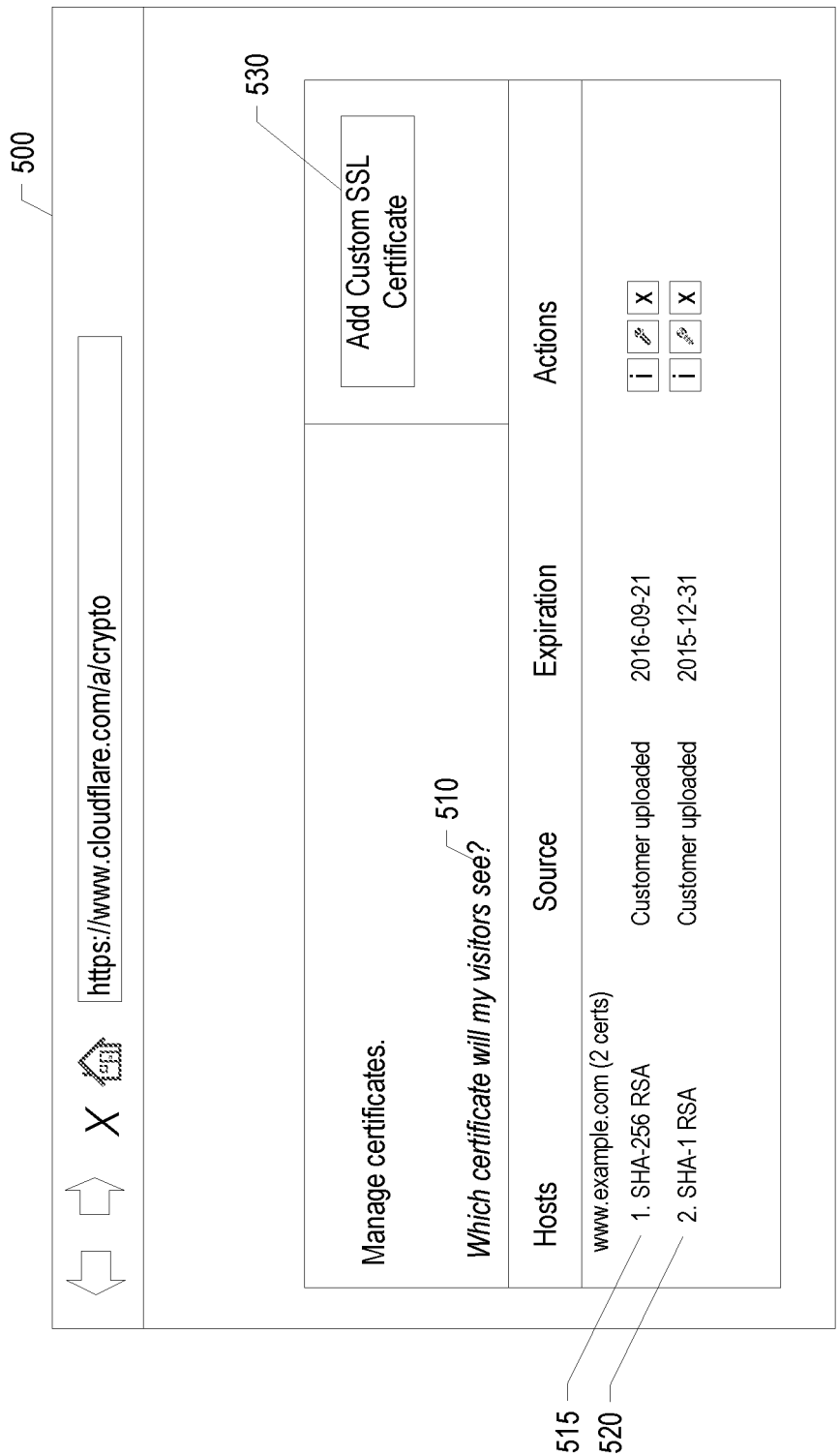
FIG. 5 illustrates an exemplary interface provided by a service server that allows a customer to manage their certificates for a hostname according to an embodiment.
Figure 6:
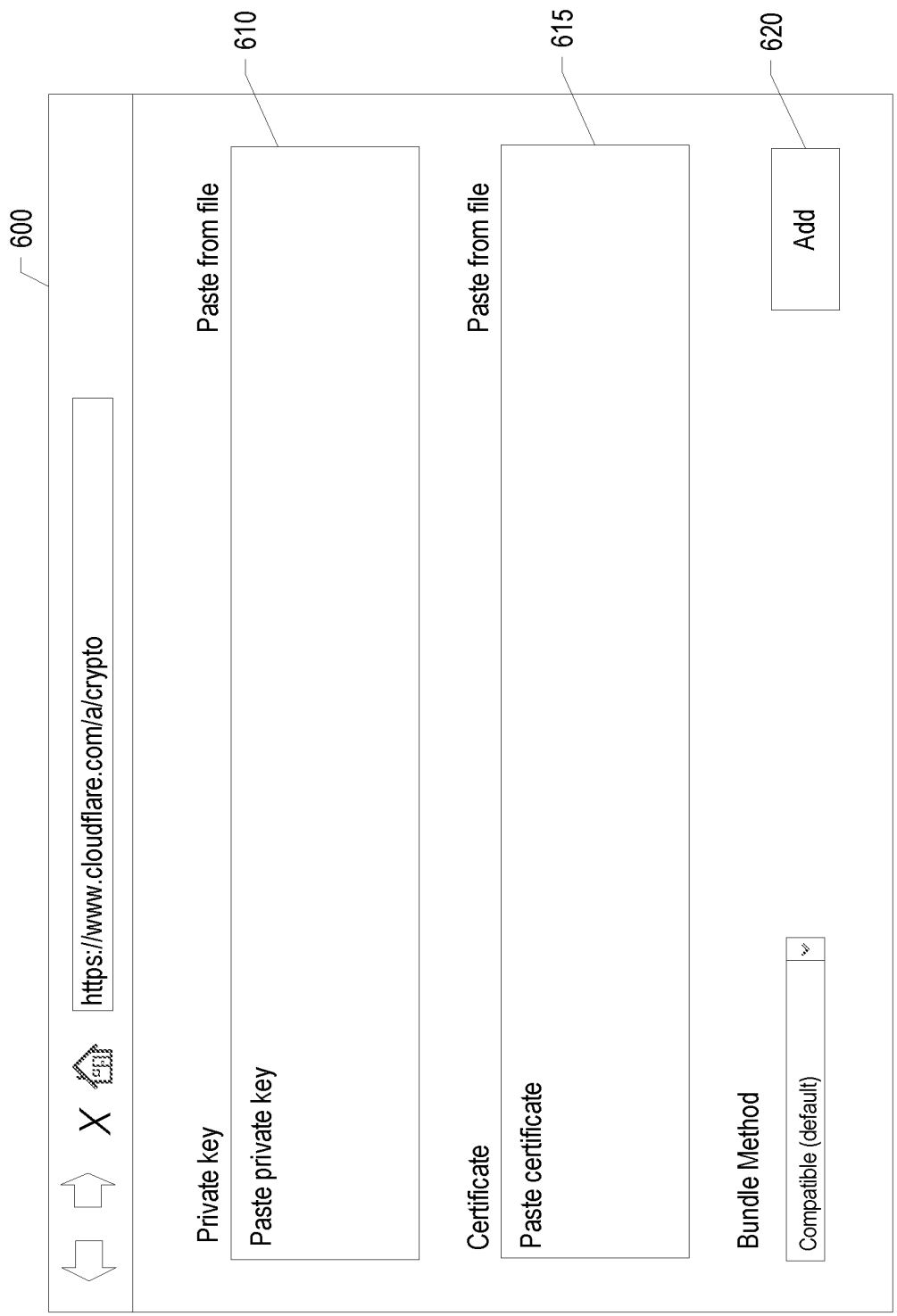
FIG. 6 illustrates an exemplary interface for a customer to upload a certificate according to an embodiment.

FIG. 5 illustrates an exemplary interface provided by the service server 140 that allows a customer to manage their certificates for a hostname according to an embodiment. As illustrated in FIG. 5, the customer has two certificates installed for the hostname www.example.com: (1) a certificate 515 that is signed using the RSA signature algorithm with a SHA-256 cryptographic hash algorithm; and (2) a certificate 520 that is signed using the RSA signature algorithm with a SHA-1 cryptographic hash algorithm. These certificates have been uploaded to the website by the customer through, for example, selection of the add custom SSL certificate button 530, which when selected, allows the customer to upload certificates for the hostname. For instance, FIG. 6 illustrates an exemplary interface that may be displayed in response to the add custom SSL certificate button 530 being selected that includes a field 610 for the customer to input their private key, a field 615 for the customer to input their corresponding certificate, and a button 620 to upload the certificate.

Figure 7:
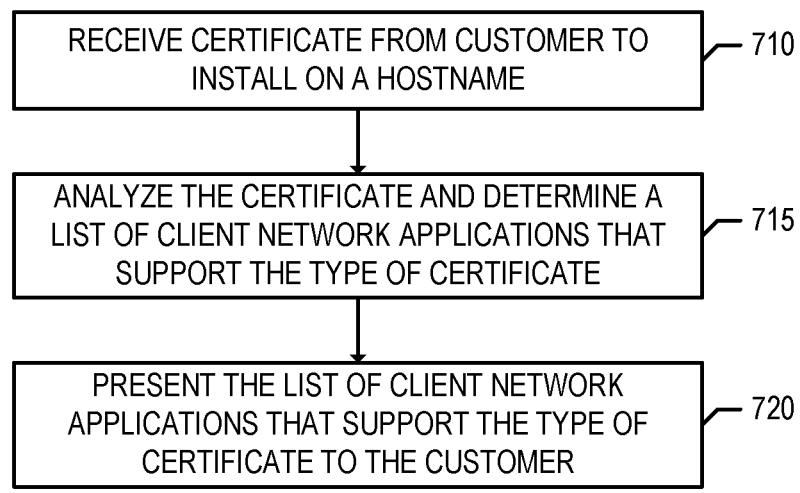
FIG. 7 is a flow diagram that illustrates exemplary operations performed responsive to a customer uploading a certificate according to an embodiment.

FIG. 7 is a flow diagram that illustrates exemplary operations performed responsive to a customer uploading a certificate according to an embodiment. At operation 710, the service server 140 receives a certificate from a customer to install for a hostname. For instance, the customer may use the interface shown in FIGS. 5 and 6 to upload the certificate to the service server 140. Different client network applications may support different certificates. For example, older client network applications may not support newer cryptography. At operation 715, the service server 140 analyzes the certificate and determines a list of client network applications (e.g., browsers) that support that type of certificate. The service server 140 includes, or has access to, information that defines the secure session capabilities of known client network applications and operating systems; and uses that information to determine the client network applications that support that type of certificate. Next, at operation 720, the service server 140 presents the list of client network applications that support the certificate received from the customer. The service server 140 may also present any known weaknesses of the received certificate, such as if the cipher is not recommended or known to be insecure.

Figure 8:
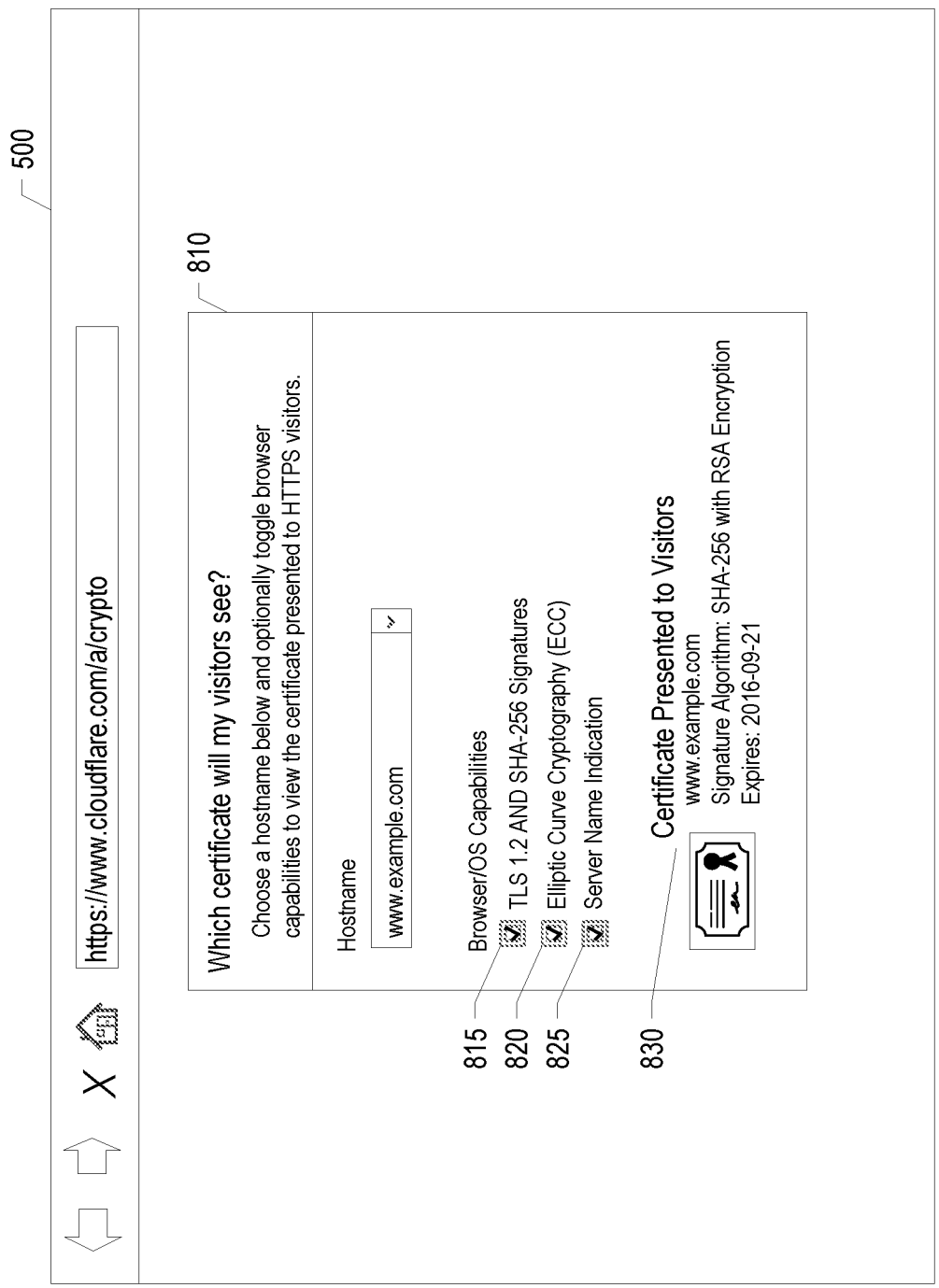
FIG. 8 illustrates an exemplary interface for allowing a customer to see which certificate will be presented to its visitors according to an embodiment.

Referring back to FIG. 5, the interface 500 also includes a link 510 that, when selected, allows the customer to see which certificate their visitors will see in varying circumstances. FIG. 8 illustrates an interface 810 that is shown when the link 510 is selected, according to an embodiment. The interface 810 allows the customer to specify the hostname (in this example the hostname is www.example.com) and toggle browser/OS capabilities to show to the customer which certificate will be presented to visitors that have those browser/OS capabilities. For instance, the interface 810 includes a checkbox 815 that allows the customer to toggle a browser supporting TLS 1.2 and SHA-256 cryptographic hash algorithm; a checkbox 820 that allows the customer to toggle a browser supporting Elliptic Curve Cryptography (ECC); and a checkbox 825 that allows the customer to toggle a browser supporting Server Name Indication. As illustrated in FIG. 8, each of the checkboxes 815, 820, and 825 are checked. Based on the provided browser/OS capabilities (as input through the checkboxes 815, 820, and 825), the interface 810 shows the certificate 830 that is presented to visitors having those browser/OS capabilities. In the example of FIG. 8, the certificate 830 that is presented to visitors with these properties for the hostname www.example.com has a signature algorithm signed using the RSA signature algorithm with a SHA-256 cryptographic hash algorithm.

Figure 9:
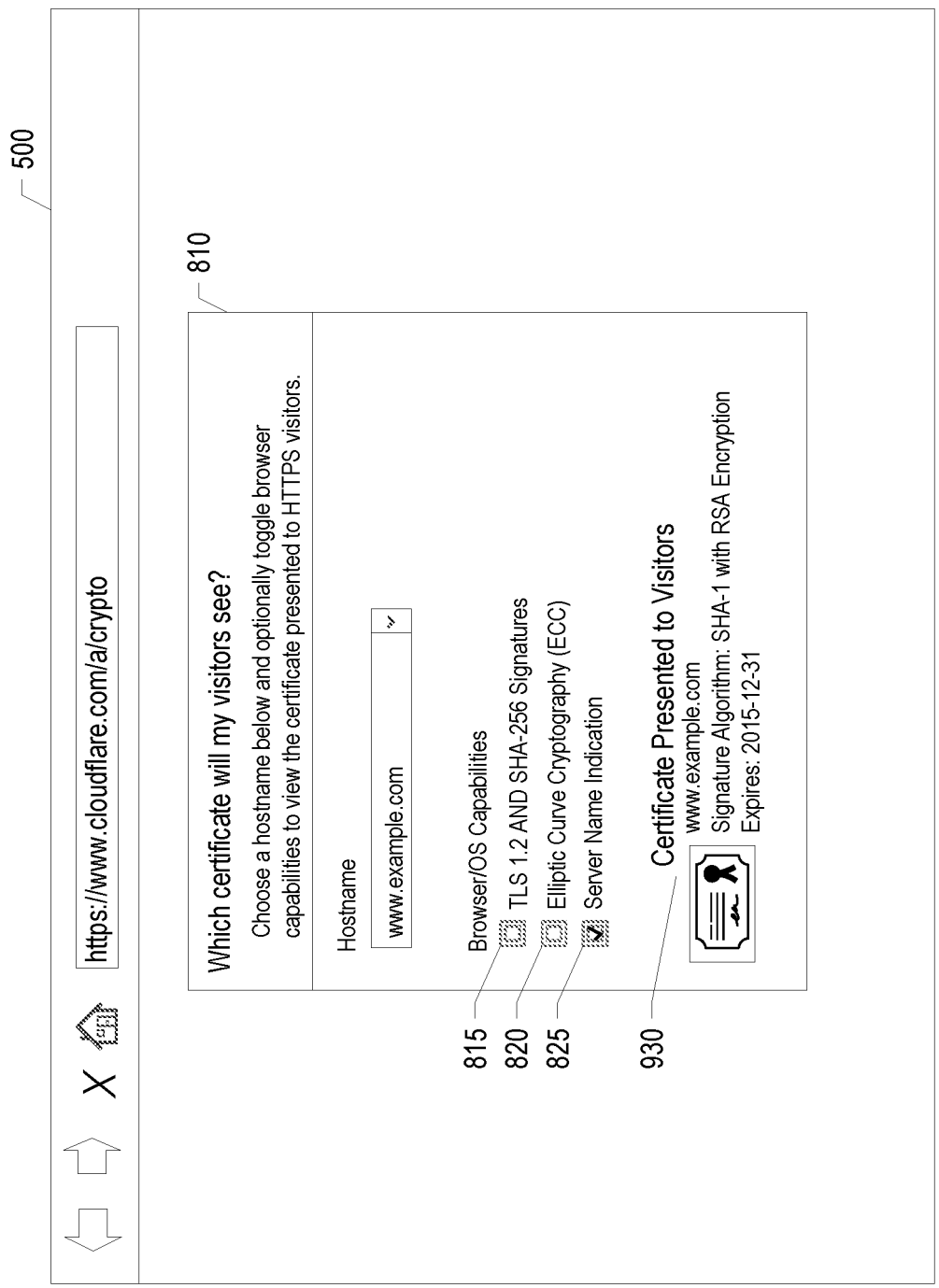
FIG. 9 illustrates the interface of FIG. 8 with a different set of selected browser/OS capabilities than FIG. 8 and the different certificate that is presented as a result, according to an embodiment.

FIG. 9 illustrates the interface 810 with a different set of selected browser/OS capabilities than FIG. 8 and the different certificate that is presented as a result. In FIG. 9, the browser/OS does not support TLS 1.2 and SHA-256 cryptographic hash algorithm (as indicated by the checkbox 815 being clear), does not support ECC (as indicated by the checkbox 820 being clear), but does support SNI (as indicated by the checkbox 825 being checked). Based on these provided browser/OS capabilities, the interface 810 shows the certificate 930 that is presented to visitors having those browser/OS capabilities. In the example of FIG. 9, the certificate 930 that is presented to visitors with these properties for the hostname www.example.com has a signature algorithm signed using the RSA signature algorithm with a SHA-1 cryptographic hash algorithm.

Figure 10:
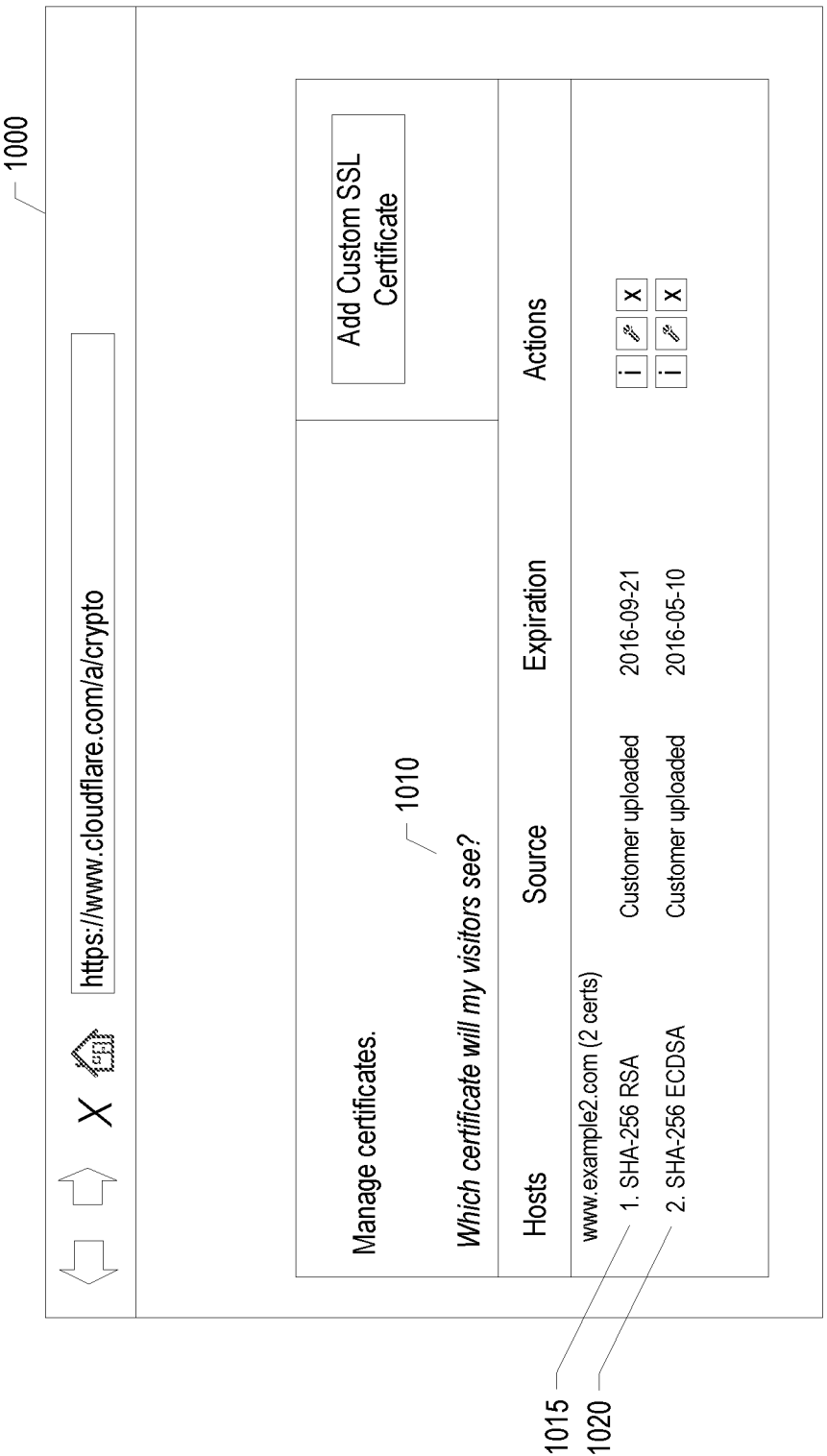
FIG. 10 illustrates an exemplary interface provided by the service server that allows a customer to manage their certificates for a hostname according to an embodiment.
Figure 11:
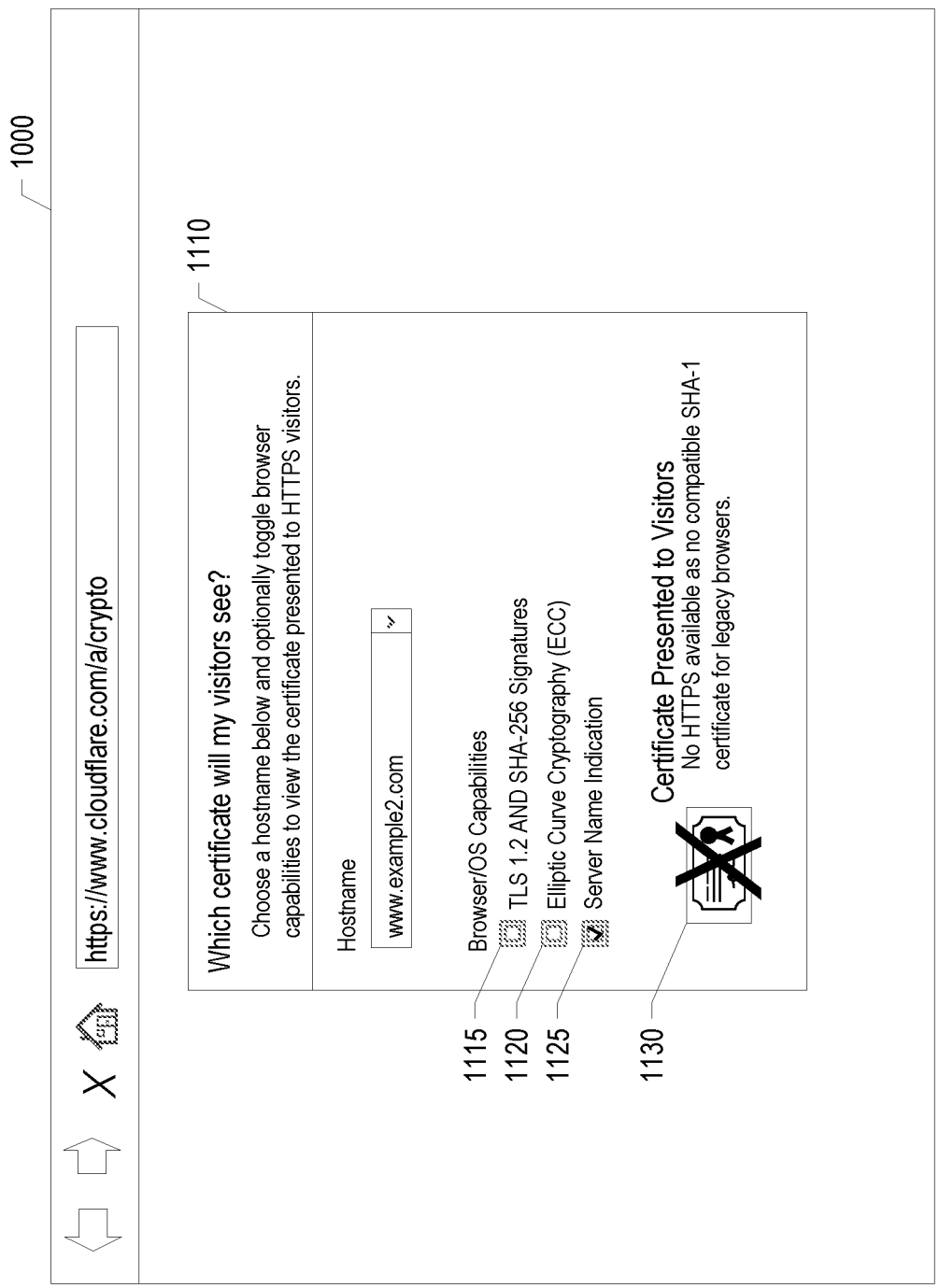
FIG. 11 illustrates an exemplary interface for allowing a customer to see which certificate will be presented to its visitors according to an embodiment.

FIG. 10 illustrates an exemplary interface provided by the service server 140 that allows a customer to manage their certificates for a hostname according to an embodiment. FIG. 10 is similar to FIG. 5, however the example of FIG. 10 shows a customer having two certificates installed for the hostname www.example2.com: (1) a certificate 1015 that is signed using the RSA signature algorithm with a SHA-256 cryptographic hash algorithm; and (2) a certificate 1020 that is signed using the ECDSA signature algorithm with a SHA-256 cryptographic hash algorithm. The interface 1000 also includes a link 1010 that, when selected, allows the customer to see which certificate their visitors will see in varying circumstances. FIG. 11 illustrates an interface 1110 that is shown when the link 1010 is selected, according to an embodiment. The interface 1110 allows the customer to specify the hostname (in this example the hostname is www.example2.com) and toggle browser/OS capabilities to show to the customer which certificate will be presented to visitors that have those browser/OS capabilities. For instance, the interface 1110 includes a checkbox 1115 that allows the customer to toggle a browser supporting TLS 1.2 and SHA-256 cryptographic hash algorithm; a checkbox 1120 that allows the customer to toggle a browser supporting Elliptic Curve Cryptography (ECC); and a checkbox 1125 that allows the customer to toggle a browser supporting Server Name Indication. As illustrated in FIG. 11, the browser/OS does not support TLS 1.2 and SHA-256 cryptographic hash algorithm (as indicated by the checkbox 1115 being clear), does not support ECC (as indicated by the checkbox 1120 being clear), but does support SNI (as indicated by the checkbox 1125 being checked). Based on these provided browser/OS capabilities, however, there is not a compatible certificate since the available certificates 1015 and 1020 for the hostname www.example2.com both use SHA-256 as a cryptographic hash algorithm. Accordingly, the interface 1110 shows that there is no certificate 930 presented to visitors as there was not a compatible SHA-1 certificate.

Figure 12:
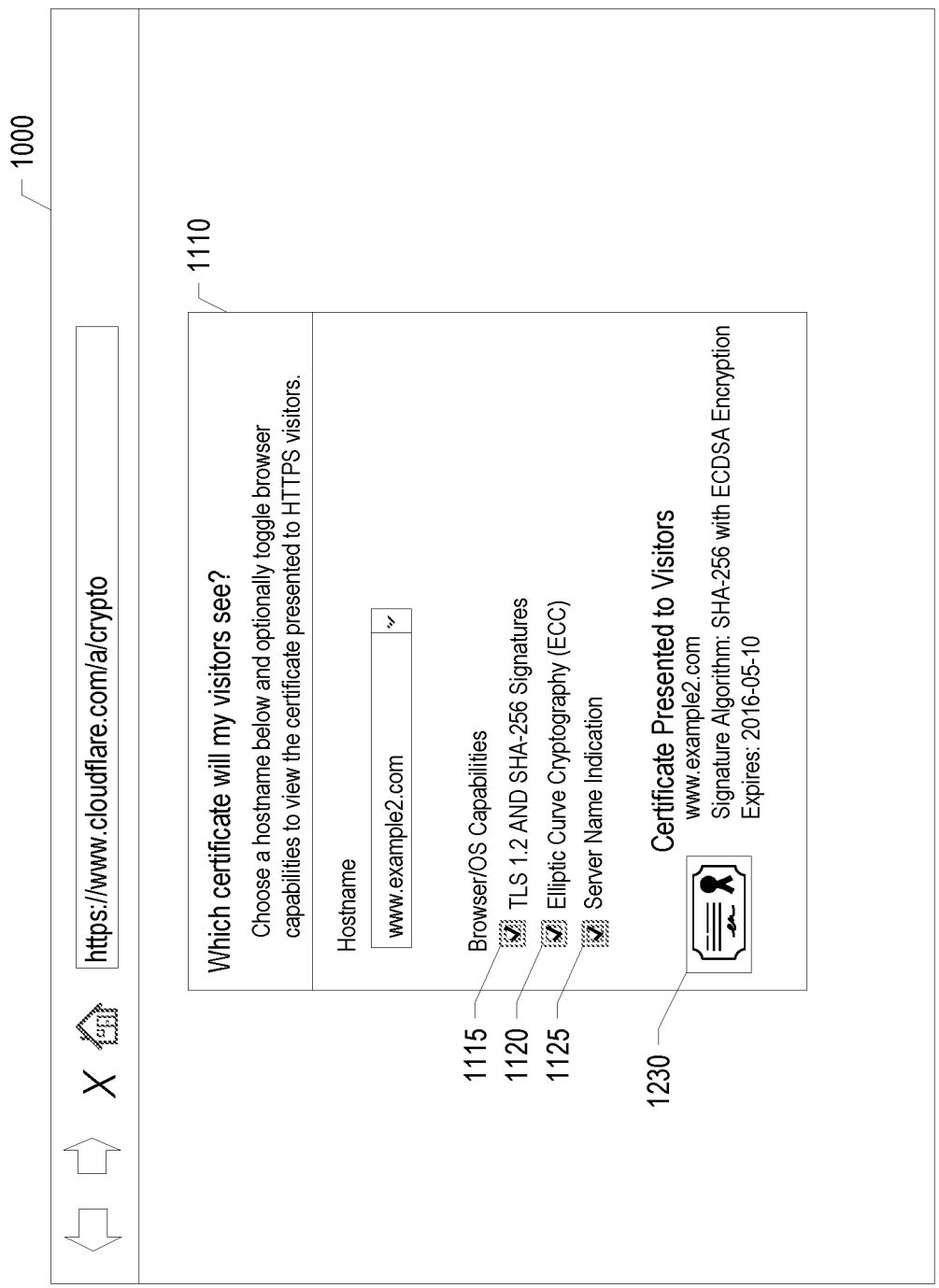
FIG. 12 illustrates the interface of FIG. 11 with a different set of selected browser/OS capabilities than FIG. 11 and the different certificate that is presented as a result, according to an embodiment.

FIG. 12 illustrates the interface 1110 with a different set of selected browser/OS capabilities than FIG. 11 and the different certificate that is presented as a result. In FIG. 12, each of the checkboxes 1115, 1120, and 1125 are checked, representing browser/OS capabilities that support TLS 1.2 and SHA-256 cryptographic hash algorithm, support ECC, and supports SNI. Based on these provided browser/OS capabilities, the interface 1110 shows the certificate 1230 that is presented to visitors having those browser/OS capabilities. In the example of FIG. 11, the certificate 1230 that is presented to visitors with these properties for the hostname www.example2.com has a signature algorithm signed using the ECDSA signature algorithm with a SHA-256 cryptographic hash algorithm.

Figure 13:
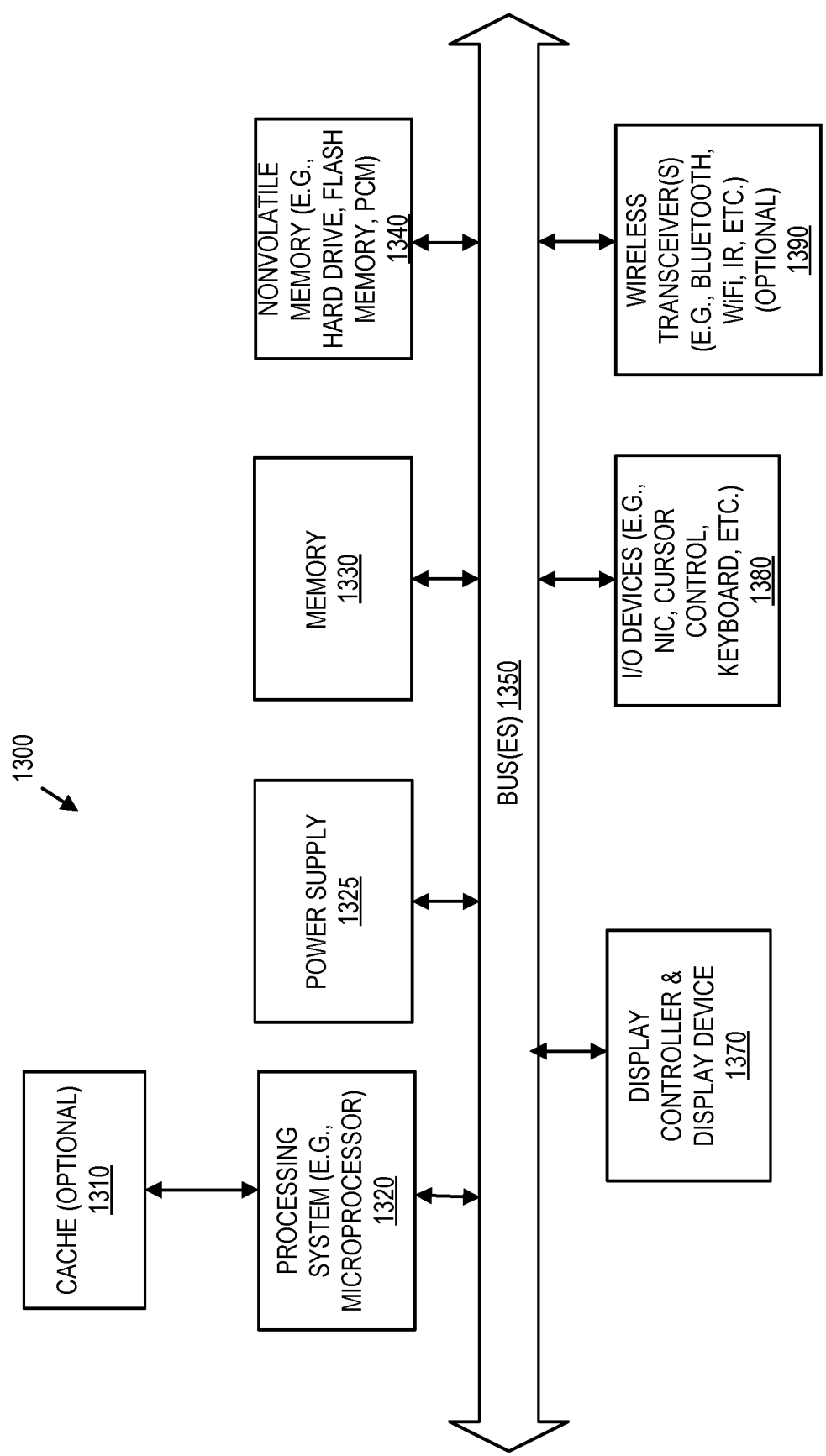
FIG. 13 illustrates an exemplary computer system which may be used in embodiments.

As illustrated in FIG. 13, the computer system 1300, which is a form of a data processing system, includes the bus(es) 1350 which is coupled with the processing system 1320, power supply 1325, memory 1330, and the nonvolatile memory 1340 (e.g., a hard drive, flash memory, Phase-Change Memory (PCM), etc.). The bus(es) 1350 may be connected to each other through various bridges, controllers, and/or adapters as is well known in the art. The processing system 1320 may retrieve instruction(s) from the memory 1330 and/or the nonvolatile memory 1340, and execute the instructions to perform operations described herein. The bus 1350 interconnects the above components together and also interconnects those components to the display controller & display device 1370, Input/Output devices 1380 (e.g., NIC (Network Interface Card), a cursor control (e.g., mouse, touchscreen, touchpad, etc.), a keyboard, etc.), and the optional wireless transceiver(s) 1390 (e.g., Bluetooth, WiFi, Infrared, etc.). In one embodiment, the client device 110, the server device 130, the service server 140, and/or the customer device 150, can take the form of the computer system 1300.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server, comprising:
    receiving a first request from a first client network application executing on a first client device that initiates a first handshake procedure to establish a first secure session;
    analyzing the first request to determine a first set of one or more properties of the first request, wherein the determined first set of one or more properties specifies that the first client network application supports:
        an Elliptic Curve Digital Signature Algorithm (ECDSA) with a first cryptographic hash algorithm, and
        a Rivest-Shamir-Adleman (RSA) signature algorithm with a second cryptographic hash algorithm;
    selecting, from a plurality of certificates for a hostname for the server that includes a first certificate that is signed using ECDSA with the first cryptographic hash algorithm and a second certificate that is signed using RSA with the second cryptographic hash algorithm, the first certificate based at least in part on the determined first set of one or more properties of the first request; and
    returning the selected first certificate to the first client network application.

2. The method of claim 1, wherein at least one property of the determined first set of one or more properties is that the first request specifies the hostname.

3. The method of claim 2, wherein at least one property of the determined first set of one or more properties is that the first request specifies which one or more signature and hash algorithm pairs is supported by the first client network application.

4. The method of claim 1, further comprising:
    receiving a second request from a second client network application executing on a second client device that initiates a second handshake procedure to establish a second secure session;
    analyzing the second request to determine a second set of one or more properties of the second request including whether the second request specifies the hostname and whether the second request specifies which one or more signature and hash algorithm pairs is supported by the second client network application;
    responsive to the determined second set of properties not specifying the hostname or not specifying which one or more signature and hash algorithm pairs is supported by the second client network application, selecting, from the plurality of certificates for the hostname for the server, the second certificate; and
    returning the selected second certificate to the second client network application.

5. The method of claim 1, wherein the first cryptographic hash algorithm is a same algorithm as the second cryptographic hash algorithm.

6. The method of claim 1, wherein at least one property of the determined first set of one or more properties includes a list of cipher suites specified in the first request as being supported by the first client network application.

7. The method of claim 1, wherein selecting the first certificate from the plurality of certificates for the hostname for the server further includes accessing a certificate selection rule that is defined by a customer belonging to the hostname.

8. The method of claim 1, wherein the received first request from the first client network application is a ClientHello message, and wherein analyzing the first request includes analyzing one or more extensions of the ClientHello message.

9. A non-transitory machine-readable storage medium that provides instructions that, if executed by a processor of a server, will cause said processor to perform operations comprising:
    receiving a first message from a first client network application executing on a first client device that initiates a first handshake procedure to establish a first secure session;
    determining that the first message includes a first set of one or more properties that specify a hostname for the server and indicate one or more signature and hash algorithm pairs supported by the first client network application;
    selecting, from a plurality of certificates for the hostname and based on the first set of one or more properties included in the first message, a first certificate for the hostname that is signed using one of the one or more signature and hash algorithm pairs supported by the first client network application;

transmitting the selected first certificate to the first client network application;

receiving a second message from a second client network application executing on a second client device that initiates a second handshake procedure to establish a second secure session;

determining that the second message does not include a second set of one or more properties that specify the hostname and indicate a set of one or more signature and hash algorithm pairs supported by the second client network application;

selecting, from the plurality of certificates for the hostname and based on the determination that the second message does not include the first set of one or more properties that specify the hostname and indicate one or more signature and hash algorithm pairs supported by the second client network application, a second certificate for the hostname that is compatible for the second client network application, wherein the first certificate and the second certificate use a different signature and hash algorithm pair; and transmitting the selected second certificate to the second client network application.

10. The non-transitory machine-readable storage medium of claim 9, wherein selecting the first certificate is further based on a set of one or more cipher suites listed in the first message, wherein the first certificate is compatible with the set of one or more cipher suites.

11. The non-transitory machine-readable storage medium of claim 9, wherein the selected second certificate is signed using a Rivest-Shamir-Adleman (RSA) signature algorithm with a Secure Hash Algorithm 1 (SHA-1) cryptographic hash algorithm.

12. The non-transitory machine-readable storage medium of claim 9, wherein the one or more signature and hash algorithm pairs supported by the first client network application include a Rivest-Shamir-Adleman (RSA) signature algorithm with a Secure Hash Algorithm 256 (SHA-256) cryptographic hash algorithm, and wherein the selected first certificate is signed using the RSA signature algorithm with the SHA-256 cryptographic hash algorithm.

13. The non-transitory machine-readable storage medium of claim 9, wherein the one or more signature and hash algorithm pairs supported by the first client network application include: a Rivest-Shamir-Adleman (RSA) signature algorithm with a Secure Hash Algorithm 256 (SHA-256) cryptographic hash algorithm; and an Elliptic Curve Digital Signature Algorithm (ECDSA) with the SHA-256 cryptographic hash algorithm; and wherein the selected first certificate is signed using ECDSA with the SHA-256 cryptographic hash algorithm.

14. A non-transitory machine-readable storage medium that provides instructions that, if executed by a processor of a server, will cause said processor to perform operations comprising:

receiving a first request from a first client network application executing on a first client device that initiates a first handshake procedure to establish a first secure session;

analyzing the first request to determine a first set of one or more properties of the first request, wherein the determined first set of one or more properties specifies that the first client network application supports:

an Elliptic Curve Digital Signature Algorithm (ECDSA) with a first cryptographic hash algorithm, and a Rivest-Shamir-Adleman (RSA) signature algorithm with a second cryptographic hash algorithm;

selecting, from a plurality of certificates for a hostname for the server that includes a first certificate that is signed using ECDSA with the first cryptographic hash algorithm and a second certificate that is signed using RSA with the second cryptographic hash algorithm, the first certificate based at least in part on the determined first set of one or more properties of the first request; and returning the selected first certificate to the first client network application.

15. The non-transitory machine-readable storage medium of claim 14, wherein at least one property of the determined first set of one or more properties is that the first request specifies the hostname.

16. The non-transitory machine-readable storage medium of claim 15, wherein at least one property of the determined first set of one or more properties is that the first request specifies which one or more signature and hash algorithm pairs is supported by the first client network application.

17. The non-transitory machine-readable storage medium of claim 14, wherein the operations further comprise:

receiving a second request from a second client network application executing on a second client device that initiates a second handshake procedure to establish a second secure session;

analyzing the second request to determine a second set of one or more properties of the second request including whether the second request specifies the hostname and whether the second request specifies which one or more signature and hash algorithm pairs is supported by the second client network application;

responsive to the determined second set of properties not specifying the hostname or not specifying which one or more signature and hash algorithm pairs is supported by the second client network application, selecting, from the plurality of certificates for the hostname for the server, the second certificate; and returning the selected second certificate to the second client network application.

18. The non-transitory machine-readable storage medium of claim 14, wherein the first cryptographic hash algorithm is a same algorithm as the second cryptographic hash algorithm.

19. The non-transitory machine-readable storage medium of claim 14, wherein at least one property of the determined first set of one or more properties includes a list of cipher suites specified in the first request as being supported by the first client network application.

20. The non-transitory machine-readable storage medium of claim 14, wherein selecting the first certificate from the plurality of certificates for the hostname for the server further includes accessing a certificate selection rule that is defined by a customer belonging to the hostname.

21. The non-transitory machine-readable storage medium of claim 14, wherein the received first request from the first client network application is a ClientHello message, and wherein analyzing the first request includes analyzing one or more extensions of the ClientHello message.

* * * * *